United States Patent
Nornes

(10) Patent No.: US 7,511,608 B2
(45) Date of Patent: Mar. 31, 2009

(54) TIRE PRESSURE MONITORING SYSTEM TELEGRAM WITH SUPPRESSED ID

(75) Inventor: Jan Einar Nornes, Horten (NO)

(73) Assignee: Infineon Technologies Sensonor AS, Horten (NO)

( * ) Notice: Subject to any disclaimer, the term of this patent is extended or adjusted under 35 U.S.C. 154(b) by 345 days.

(21) Appl. No.: 11/539,762

(22) Filed: Oct. 9, 2006

(65) Prior Publication Data

US 2007/0090936 A1   Apr. 26, 2007

(30) Foreign Application Priority Data

Oct. 21, 2005   (EP) ................... 05256544

(51) Int. Cl.
   *B60C 23/00*   (2006.01)
(52) U.S. Cl. .................. 340/445; 340/447; 701/32
(58) Field of Classification Search ......... 340/442–448; 701/29, 32
   See application file for complete search history.

(56) References Cited

U.S. PATENT DOCUMENTS

| | | | |
|---|---|---|---|
| 5,335,540 A * | 8/1994 | Bowler et al. ............... | 340/447 |
| 5,463,374 A * | 10/1995 | Mendez et al. .............. | 340/447 |
| 5,559,484 A | 9/1996 | Nowicki et al. | |
| 6,469,621 B1 | 10/2002 | Vredevoogd et al. | |
| 6,535,116 B1 | 3/2003 | Zhou | |
| 6,696,935 B2 * | 2/2004 | Bonardi et al. .............. | 340/447 |
| 2002/0075145 A1 | 6/2002 | Hardman et al. | |
| 2002/0177406 A1 | 11/2002 | O'Connor et al. | |
| 2004/0036589 A1 | 2/2004 | Lin | |

FOREIGN PATENT DOCUMENTS

EP   0671289 A1   9/1995

* cited by examiner

*Primary Examiner*—Thomas J Mullen
(74) *Attorney, Agent, or Firm*—Edell, Shapiro & Finnan, LLC

(57) ABSTRACT

A tire pressure monitoring system receiver includes a storage unit to store transmitter IDs associated with a plurality tire pressure monitoring system transmitters, a receiving unit to receive a transmitted tire pressure monitoring system telegram and a transmitted checksum, a calculating unit to calculate a test checksum from the received telegram and one of the stored IDs, a comparing unit to compare the test checksum with the transmitted checksum, and an identification unit to identify a source transmitter from the test checksum in response to finding a match between the test checksum and the transmitted checksum.

16 Claims, 2 Drawing Sheets

TIRE PRESSURE MONITORING SYSTEM TELEGRAM WITH SUPPRESSED ID

CROSS REFERENCE TO RELATED APPLICATIONS

This application claims priority under 35 U.S.C. §119 to Application No. EP 05256544.7 filed on Oct. 21, 2005, entitled "Tyre Pressure Monitoring System Telegram with Suppressed ID," the entire contents of which are hereby incorporated by reference.

FIELD OF THE INVENTION

The present invention relates to Tire Pressure Monitoring Systems (TPMS).

BACKGROUND

Direct measuring TPMSs are becoming a common feature in modem vehicles. These systems consist of two main system components: sensing modules placed inside each wheel and a central reception unit placed inside the vehicle. A sensing module of a direct measuring TMPS has three main contributions to the overall energy consumption. These are power down current between active operation, radio frequency (RF) transmission and sensor measurements. All known direct measuring TPMSs rely on locally stored energy in order to operate and transmit information. The stored energy is in the form of a battery or is accumulated in small amounts from the surroundings.

A problem with such TMPSs is how to minimize the total amount of energy needed for operation, thereby minimizing the overall cost, volume and weight of the sensing modules.

SUMMARY

The present invention provides a solution which reduces considerably the amount of energy needed to send the required information from each sensing module to the central receiver unit. According to the present invention there is provided a tire pressure monitoring system (TPMS) receiver including:

a storage unit arranged to store, in use, transmitter IDs associated with each of a plural number (N) of TPMS transmitters respectively;

a receiving unit arranged to receive, in use, a transmitted TPMS telegram and a transmitted checksum calculated from the TPMS telegram and one of the transmitter IDs;

a calculating unit arranged to calculate, on receipt of the TPMS telegram in use, a test checksum from the received TPMS telegram and one of the stored IDs;

a comparing unit arranged to compare, in use, the test checksum with the received checksum; and an identification unit arranged to identify, in use, the transmitter whose associated transmitter ID was used to calculate the test checksum as being the source transmitter if the test checksum is identical to the received checksum.

According to the present invention there is further provided a system for identifying which one of a plural number (N) of transmitters in a TPMS is a source transmitter of a tire pressure monitoring system (TPMS) telegram, the system including:

a second calculating unit arranged to calculate, in use, a checksum from a TPMS telegram and transmitter ID;

a transmitting unit arranged to transmit, in use, the TPMS telegram and the checksum; and a TPMS receiver of the type defined above.

According to the present invention there is further provided a method of identifying which one of a plural number of transmitters in a TPMS is a source transmitter of a TPMS telegram, the method including:

calculating a checksum from a TPMS telegram and a transmitter ID;

transmitting the TPMS telegram to a receiver;

transmitting the calculated checksum to the receiver;

calculating a test checksum from the transmitted TPMS telegram and one of N stored transmitter IDs associated with one of the N transmitters;

comparing the test checksum with the transmitted checksum;

identifying the transmitter whose transmitter ID was used to calculate the test checksum as being the source transmitter if the test checksum is identical to the transmitted checksum.

The described device saves energy relating to RF transmission without sacrificing the amount of information sent. This is achieved by providing a way of identifying the unit responsible for a telegram without requiring the transmission of the ID for that unit.

The above and still further features and advantages of the described device will become apparent upon consideration of the following definitions, descriptions and descriptive figures of specific embodiments thereof, wherein like reference numerals in the various figures are utilized to designate like components. While these descriptions go into specific details of the device, it should be understood that variations may and do exist and would be apparent to those skilled in the art based on the descriptions herein.

BRIEF DESCRIPTION OF THE DRAWINGS

The device is explained in more detail below with reference to exemplary embodiments, where.

DETAILED DESCRIPTION

Figure 1:
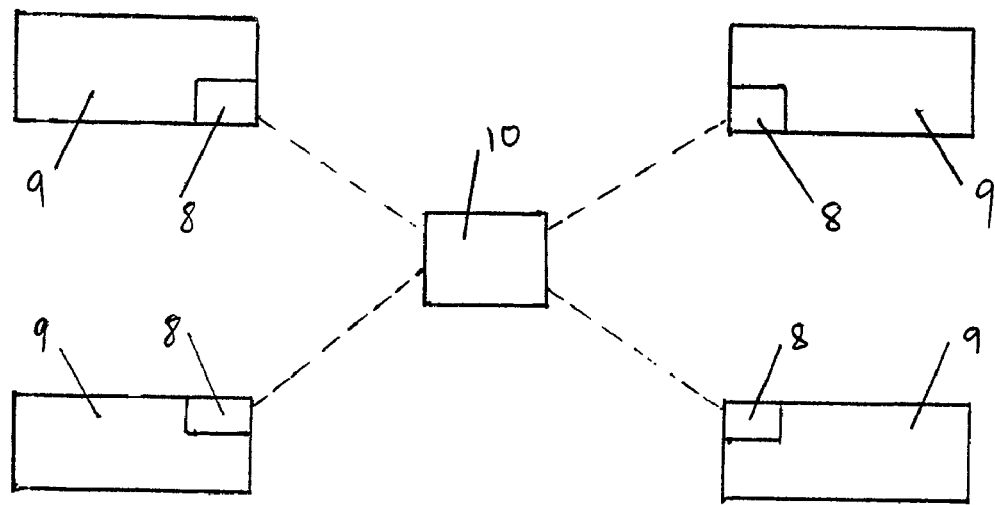
FIG. 1 is a schematic diagram showing the components of a system of an example system according to the described device.

Referring to FIG. 1, vehicles with TPMSs have a transmitter unit 8 for each wheel 9 and sometimes also the spare wheel (not shown); therefore, each vehicle typically includes, but is not limited to, four or five transmitter units 8. Each unit 8 transmits data packages known as telegrams (or alternatively as datagrams or data frames for example), shown in FIG. 2, containing information, for example, pressure 2, temperature 3 and other status information 4 of the tires in the vehicle.

Figure 2:
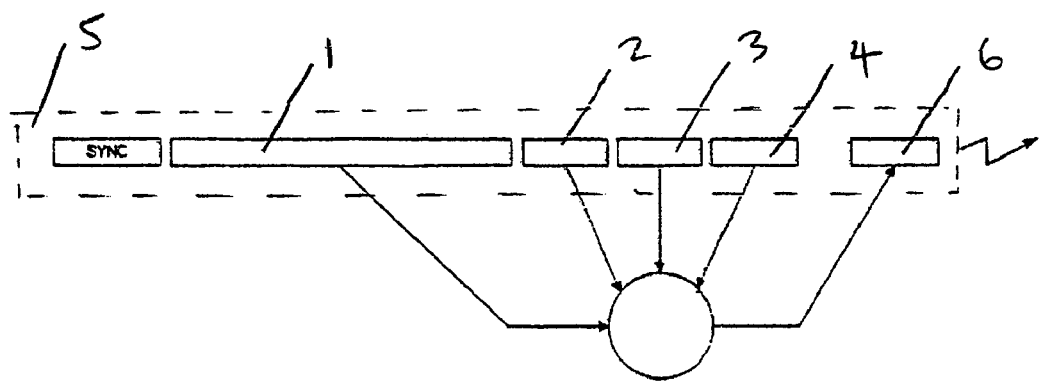
FIG. 2 is a schematic diagram showing the components of a prior art TPMS telegram transmission.

Referring also to FIG. 2, conventionally, every telegram 5 transmitted in a TPMS contains a unique 32-bit ID 1 which is transmitted with the telegram 5 to identify the unit 8 responsible for transmitting the telegram 5. Furthermore, 32-bit ID 1 is used to verify that the telegram 5 is not coming from another vehicle nearby. The IDs for all the transmitter units 8 are stored in a central unit 10 and the ID field of each incoming telegram is checked against the stored IDs.

For each telegram 5, a checksum 6, for example, an 8-bit or 16-bit cyclic redundancy code (CRC), that is calculated from the telegram 5 and the ID 1 is also transmitted to give a reasonable degree of confidence that the telegram 5 was received correctly. On reception of a telegram 5, the central unit 10 calculates its own checksum and compares it to the received checksum 6. The checksum algorithm must be one with good quality with respect to detecting single and multiple bit errors.

Figure 3:
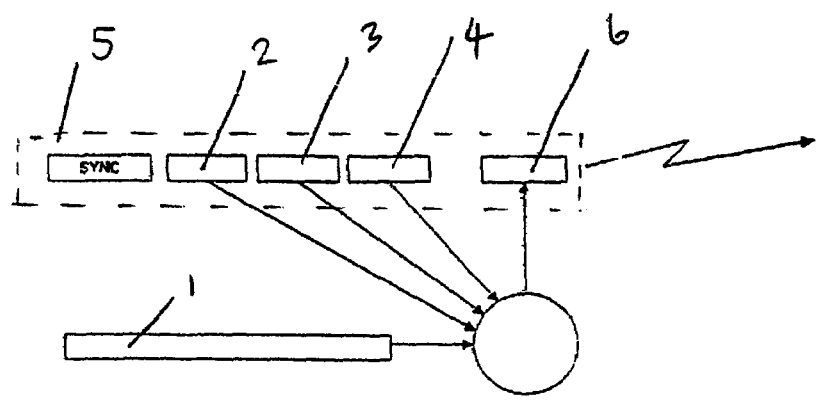
FIG. 3 is a schematic diagram showing the components of a TPMS telegram transmission according to the described device.
Figure 4:
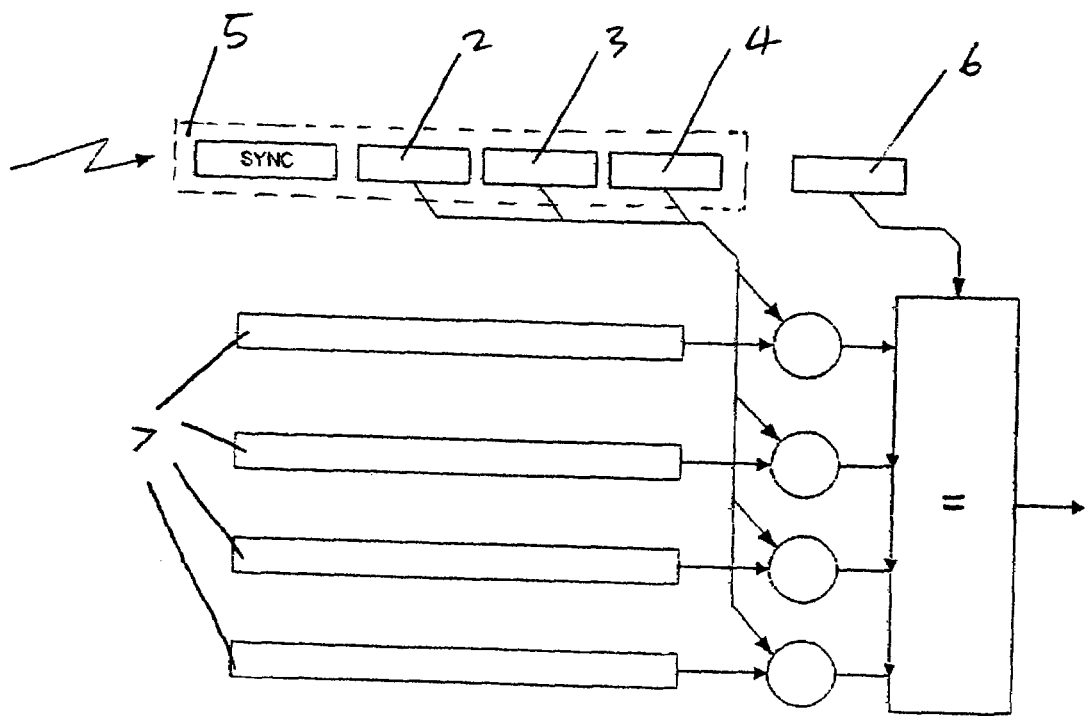
FIG. 4 is a schematic diagram showing components for calculating test checksums using a received telegram and different stored IDs.

Referring to FIG. 3 and FIG. 4, the described device makes use of the fact that if the transmitter 8 calculates the checksum 6 with the ID in the right position, the transmitter 8 does not actually have to send the ID and therefore can suppress the ID from the telegram. The control unit 10 must calculate the checksum with the ID 1 and other data 2, 3, 4 in the same order as it is in when the transmitted checksum 6 is calculated, in order to obtain matching transmitted checksum 6 and locally calculated checksum 6 for the ID of a particular transmitter 8. Calculating checksum from the same data in a different order would give a different checksum.

FIG. 3 shows a checksum 6 being calculated at a transmitter 8 with the data, 2, 3, 4 and ID 1 in a particular order, the data 2, 3, 4 and checksum 6 then being transmitted as part of a telegram 5 to a central unit 10, while the ID 1 is not transmitted. FIG. 4 shows the telegram 5 being received by the central unit 10 and checksums being calculated from stored Ids 7 and the data 2, 3, 4 in the telegram 5. These checksums are calculated with the data ID 7s and other data 2, 3, 4 in the same relative positions as in the transmitted checksum 6.

As shown in FIG. 4, the central unit 10 calculates checksums from the received telegram 5 and each of the stored IDs 7 in the correct position, in turn until a match between the transmitted checksum and the locally calculated checksum is obtained. The telegram 5 belongs to the transmitter unit 8 whose ID 1 was used to calculate the transmitted checksum 6 which the locally calculated checksum matches.

The 8-bit checksum 6 gives about a 1:256 probability that the telegram belongs to a unit other than the one giving the checksum match. If this is not sufficient, the checksum can be extended to 16-bit. This decreases the probability to 1:65536 and the telegram is still 24 bits shorter than conventional telegrams.

To increase the probability of a good transmission, many vehicle manufacturers specify that the same telegram should be sent four times. If a few bits in each of the four telegrams are changed, e.g., a frame number inserted in the status byte, this generates a totally different checksum for each transmission. If more than one telegram is received correctly, the probability figures improve even more.

There are further advantages of removing the ID from the TPMS telegram transmission. Telegrams can be detected several hundred meters away with sensitive receiver antennae. When each car is equipped with four or five transmitters sending out telegrams periodically, it is fairly simple to monitor if a car of interest passes a certain road. In parts of the world this could even represent a serious security threat towards vehicles carrying valuable goods or people of high importance. If the ID is kept secret and also suppressed during normal transmission it is much harder to reconstruct the data with respect to identifying a certain car. Transmission of the ID can be restricted to learning mode, or even more safely, entered manually through a service unit.

A further advantage is that in a crowded traffic environment, a lot of transmitters will be close to each other and the chance of lost reception due to interfering transmitters increases dramatically and therefore, reducing the transmission length decreases the chances of interference.

While the invention has been described in detail with reference to specific embodiments thereof, it will be apparent to one of ordinary skill in the art that various changes and modifications can be made therein without departing from the spirit and scope thereof. Accordingly, it is intended that the present invention covers the modifications and variations of this described device provided they come within the scope of the appended claims and their equivalents.

What is claimed is:

1. A tire pressure monitoring system (TPMS) receiver comprising:
   a storage unit configured to store transmitter identification values (IDs) associated with a plurality of tire pressure monitoring system (TPMS) transmitters, wherein each stored transmitter ID is associated with a respective TPMS transmitter;
   a receiving unit configured to receive a transmitted tire pressure monitoring system (TPMS) telegram and a transmitted checksum calculated from the telegram and one of the transmitter IDs;
   a calculating unit configured to calculate, on receipt of the telegram, a test checksum from the received telegram and one of the stored IDs;
   a comparing unit configured to compare the test checksum with the received checksum; and
   an identification unit configured to identify a source transmitter via a stored transmitter ID used to calculate the test checksum, in response to the comparing unit finding a match between the test checksum and the received checksum.

2. The TPMS receiver according to claim 1, wherein the number of TPMS transmitters is equal to an integer value between 2 and 20 inclusive.

3. The TPMS receiver according to claim 2, wherein the value equals 4.

4. The TPMS receiver according to claim 2, wherein the value equals 5.

5. The TPMS receiver according to claim 1, wherein the transmitter ID includes 32 bits.

6. The TPMS receiver according to claim 1, wherein the checksum includes one of 8 bits and 16 bits.

7. The TPMS receiver according to claim 1, wherein the checksum comprises a cyclic redundancy code (CRC) checksum.

8. A system for identifying which transmitter from a plurality of transmitters in a tire pressure monitoring system (TPMS) is a source transmitter for a tire pressure monitoring system (TPMS) telegram, the system comprising:
   a TPMS receiver according to claim 1;
   a second calculating unit configured to calculate a checksum from a TPMS telegram and a transmitter ID; and
   a transmitting unit configured to transmit the TPMS telegram and the checksum.

9. A method of identifying which transmitter from a plurality of transmitters in a tire pressure monitoring system (TPMS) is a source transmitter of a TMPS telegram, the method comprising:
   calculating a checksum from the TPMS telegram and a transmitter identification value (ID);
   transmitting the TPMS telegram to a receiver;
   transmitting the calculated checksum to the receiver;
   calculating a test checksum from the transmitted TPMS telegram and a stored transmitter ID associated with one of the plurality of transmitters;
   comparing the test checksum with the transmitted checksum; and identifying the source transmitter via the stored transmitter ID used to calculate the test checksum in response to finding a match during the comparison between the test checksum and the transmitted checksum.

10. The method of claim 9, wherein the calculating and comparing are repeated until a test checksum is found to match the transmitted checksum.

11. The method of claim 9, wherein the number of TPMS transmitters is equal to an integer value between 2 and 20 inclusive.

12. The method of claim 11, wherein the value equals 4.

13. The method of claim 11, wherein the value equals 5.

14. The method of claim 9, wherein the transmitter ID comprises 32 bits.

15. The method of claim 9, wherein the checksum includes one of 8 bits and 16 bits.

16. The method of claim 9, wherein the checksum comprises a cyclic redundancy code (CRC) checksum.

* * * * *